(12) United States Patent
Ishii et al.

(10) Patent No.: US 6,401,102 B1
(45) Date of Patent: Jun. 4, 2002

(54) VIRTUAL GEOGRAPHIC SPATIAL OBJECT GENERATING SYSTEM

(75) Inventors: Akira Ishii; Kouichi Umemiya, both of Kanagawa (JP)

(73) Assignee: Hitachi Software Engineering Co., Ltd., Kanagawa (JP)

( * ) Notice: Subject to any disclaimer, the term of this patent is extended or adjusted under 35 U.S.C. 154(b) by 0 days.

(21) Appl. No.: 09/267,820

(22) Filed: Mar. 12, 1999

(30) Foreign Application Priority Data

Jun. 26, 1998 (JP) .......................................... 10-180663

(51) Int. Cl.[7] .................... G06F 17/00; G06F 17/30; G06F 15/00
(52) U.S. Cl. ....................... 707/104; 707/500.1; 707/7
(58) Field of Search ....................... 345/320, 426–428; 395/200; 701/200; 707/104, 516, 500.1, 7–9; 725/110–116

(56) References Cited

U.S. PATENT DOCUMENTS 5,848,373 A * 12/1998 DeLorme et al. ........... 701/200
5,978,567 A * 11/1999 Rebane et al. .............. 395/200
6,144,375 A * 11/2000 Jain et al. ................... 345/320
6,151,610 A * 11/2000 Senn et al. .................. 707/516

OTHER PUBLICATIONS

Please forward applicant a WEST database copy for U.S. patent #6,144,375.*

* cited by examiner

Primary Examiner—Safet Metjahic
Assistant Examiner—Te Chen
(74) Attorney, Agent, or Firm—Fish & Richardson P.C.

(57) ABSTRACT

A virtual geographic spatial object generating system which is capable of meeting various retrieval conditions requested from a client, wherein a profile ID for each user is read in response to a log-in request from the client, while a script corresponding to the profile ID is read from a script file at an application server. By making use of the virtual geographic spatial object generating operator (hereinafter referred to simply as geographic operator) of this script, a data base server is accessed and a processing is performed so as to generate a virtual geographic spatial object. In this manner, only through a connection with the application server, various data base servers can be accessed and the operation for each user can be performed.

8 Claims, 10 Drawing Sheets

FIG. 4

<Construction of Script>                    41

| Item | Major classfication | Initiating key name | Terminating key name |
|------|---------------------|---------------------|----------------------|
| 1 | Map output attribute part | [MapAttr] | [/MapAttr] |
| 2 | Map processing part | [GOperation] | [/GOperation] |
| 3 | Connecting end data base Server attribute part | [BindAttr] | [/BindAttr] |

<Description>

[MapAttr]
   Map output attribute descriptive part     } 42
[/MapAttr]

[GOperation]
   Map processing descriptive part     } 43
[/GOperation]

[BindAttr]
   Connecting end data base server attribute descriptive part 1
   Connecting end data base server attribute descriptive part 2
   ⋮
   Connecting end data bese server attribute descriptive part n
[/BindAttr]

|   | Attributes | Classification | Operator Name | Contents |
|---|---|---|---|---|
| 1 | Map output attribute part | Display | SpatialRef | Coordinate system |
| 2 | | | Scale | Display scale |
| 3 | | | Format | Designation of transferring format |
| 4 | | | DspID | Acquisition of display information |
| 5 | Map processing part | Retrieval | REF | Retrieval |
| 6 | | Geometrical operation | ADD | Simple synthesis |
| 7 | | | LAYER | Selection according to configuration |
| 7 | | | ROTATION | Rotation |
| 8 | | | ZOOMUP | Zoom up |
| 9 | | | ZOOMDOWN | Zoom down |
| 10 | | | MOVE | Move |
| 11 | | Conversion of coordinates | CnvCoordinate | Conversion of coordinates from 19 coordinates to longitude/latitude |
| 12 | | | FITING | Operation error in coordinates conversion is corrected |
| 13 | | Conversion of data format | CnvFormat | Conversion between vector and image, from vector to vector (to another format) |
| 14 | Connecting end data base server attribute part | Communication | Protocol | Communication system |
| 15 | | | ServerType | Connecting end data base type |
| 16 | | | HostName | TCP/IP name |
| 17 | | | IPAdress | IP address |
| 18 | | | ObjName | Connecting end object name (effective where protocol is CORBA) |

FIG. 6

⟨sample.gsf⟩

[MapAttr] ---------------- 61

SpatialRef=19 ⎫
   Scale=1/500   ⎬ 62
   Format=VMF  ⎬
   DspId=1      ⎭

[/MapAttr]

[GOperation] ---------------- 63

OBJ1=REF( Server1 )
   OBJ2=LAYER(OBJ1, "road")
   OBJ3=REF( Server2 )    ⎬ 64
   OBJ4=LAYER(OBJ3, "electric pole")
   OP=ADD(OBJ2, OBJ4)

[/GOperation]

[BindAttr] ---------------- 65

[Server1]
      Protocol=CORBA
      ServerType=HMAP
      ObjName=DB1    66
   [/Server1]

[Server2]    67
      Protocol=CORBA
      ServerType=HMAP
      HostName=DB2
      IPAdress=133.108.97.200
   [/Server2]

[/BindAttr]

VIRTUAL GEOGRAPHIC SPATIAL OBJECT GENERATING SYSTEM

This application claims the benefit of the filing date under 35 U.S.C. §119(b), of Japanese application No. 180, 663/1998, filed Jun. 26, 1998, under the Paris Convention, with the Japanese Patent Office in Japan, the content of which is hereby incorporated by reference in its entirety.

BACKGROUND OF THE INVENTION

This invention relates to a virtual geographic spatial object generating system and a recording medium.

The term, "a virtual geographic spatial object" recited herein means a map which is constructed such that even a plurality of map data bases, each differing in fundamental constituent information (attribute) as a map data base such as coordination system, scale, the representation form of geographic information, etc., can be handled as the same object on a unified space. The "object" in this case means geographic information. The attribute includes various kinds of representation form such as (1) display color; (2) plane rectangular coordinates and the coordinates of latitude and longitude, etc.; (3) scale such as 1/10,000, 1/500, etc.; and (4) geographic information such as long (4Byte), double (8Byte), etc.

There has been conventionally known a client/server (C/S) system as a technique for generating geographic spatial object wherein the client side (i.e. a terminal to be directly utilized by a user) is provided in advance with a program containing not only a retrieving condition for obtaining required geographic spatial information but also a communication system for a communication with the server, so that it is possible for the client to read a corresponding retrieval condition from the program and to perform the retrieval to a designated server. On the other hand, the server receiving the retrieval condition transmitted from the client initiates to retrieve geographic spatial information stored in the data base, and the retrieved geographic spatial information is then fed back to the client. As a result, the information which has been fed back to the client is displayed on a picture screen.

According to this prior art however, there is a problem that since the patterns of retrieval condition are stored in advance in the program of the client, even if it is certainly possible to perform a retrieval under the retrieval conditions that have been stored in advance, it is impossible to perform the retrieval in a case where information other than the stored patterns of retrieval condition is requested.

Further, in conventional systems an attribute such as display color is controlled as a whole by the server, so that when the retrieval of information is requested by a plurality of clients under the same retrieval conditions, it is impossible to display the information with various attributes differing from client to client.

Further, when the retrieval is to be performed from the client side to the server side, the communication method and physical position in relative to the server side that have been stored in advance in the program are to be employed. As a result, it is impossible to access the server side by means of a communication method which is not managed by the client side.

BRIEF SUMMARY OF THE INVENTION

The object of the present invention is to provide a virtual geographic spatial object generating system, which is capable of coping with various retrieval conditions requested from the client, of easily changing the attribute such as display color according to the request made by individual user, and of accessing map data base by various communication methods with the client.

Namely, the virtual geographic spatial object generating system according to this invention is featured in that it comprises; process-executing means for executing a procedure based on the content of a message from a client; ID. notification means for reading a profile ID existing in individual user in response to a log-in request from the client and notifying the profile ID to said process-executing means; and processing means for generating a virtual geographic spatial object by performing a processing based on said profile ID.

The virtual geographic spatial object generating system of this invention is also featured in that it further comprises; position-informing means for notifying information on a stored position of script based on the aforementioned profile ID; and virtually generating means which reads the script from a script file on a basis of an input retrieval condition and said profile ID and generates geographic operators representing an operation using one or more operands from said script; wherein said processing means is designed to request a retrieval to a data base server depending on a kind of said geographic operator thus generated and to perform a processing based on said geographic operator, thereby enabling a utilization form to be changed without modifying the application of the client side.

The virtual geographic spatial object generating system of this invention is also featured in that said position-informing means is designed to notify information on a stored position of attribute information corresponding to said profile ID, thereby enabling the attribute information to be separately transmitted, thus saving a data transmission time.

The virtual geographic spatial object generating system of this invention is also featured in that it further comprises server access means for accessing the data base server according to the script and based on the retrieval condition in response to a request from said processing means, thereby enabling the client to connect with a data base server of new transmission system without necessitating a modification on the client side.

Further, this invention provides a computer-readable recording medium which is recorded with a program for enabling a computer to function as a virtual geographic spatial object generating system as mentioned above.

BRIEF DESCRIPTION OF THE SEVERAL VIEWS OF THE DRAWING

FIG. 4 is a diagram for illustrating the general construction of script;

FIG. 5 is a diagram for illustrating the geographic operator of script;

FIG. 6 is a diagram showing a specific descriptive example of script;

DETAILED DESCRIPTION OF THE INVENTION

Next, the embodiments of this invention will be explained in details with reference to the drawings.

Figure 1:
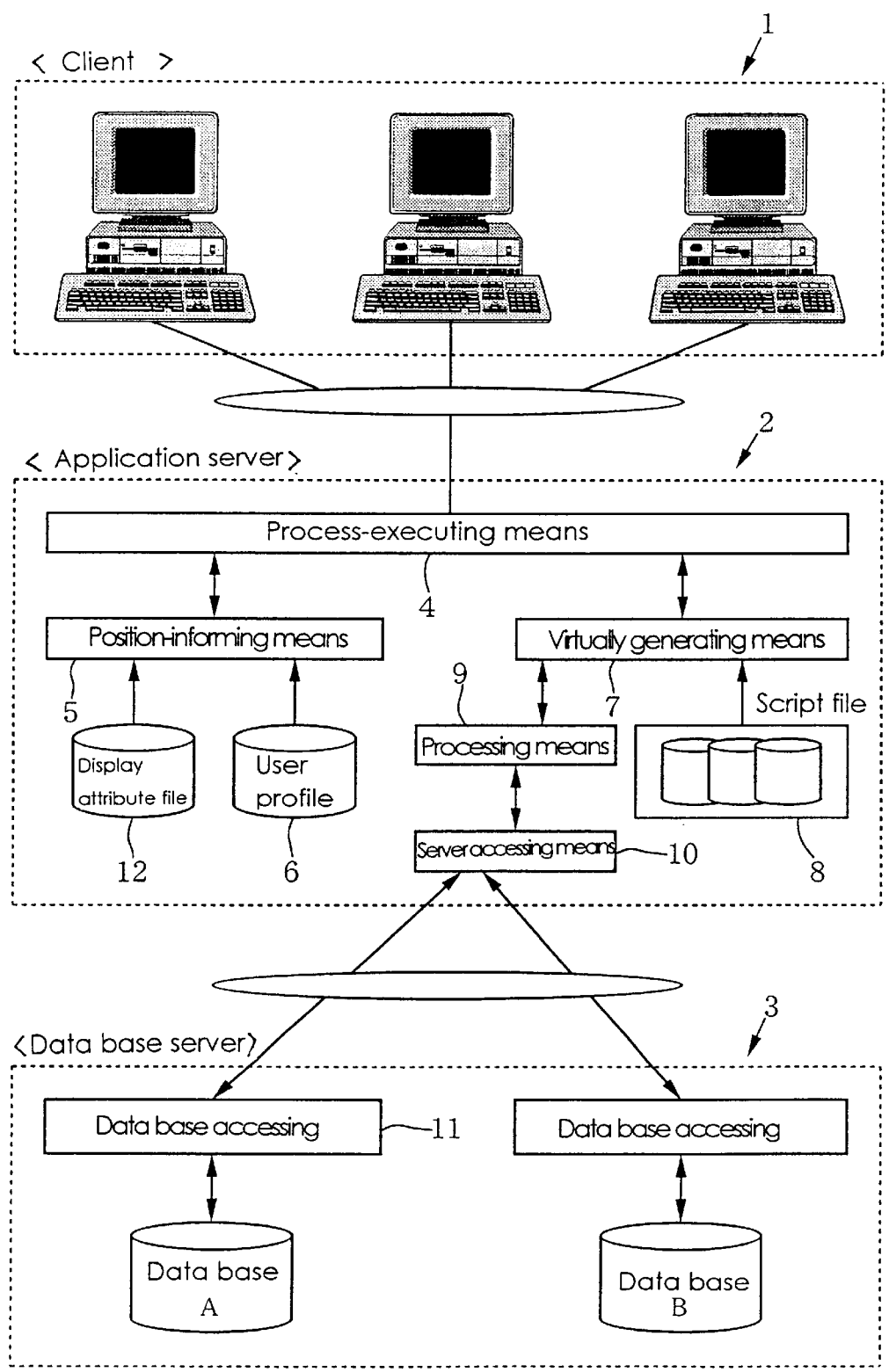
FIG. 1 is a block diagram schematically illustrating a virtual geographic spatial object generating system according to one embodiment of this invention.

FIG. 1 is a block diagram schematically illustrating a virtual geographic spatial object generating system according to one embodiment of this invention. As shown in FIG. 1, this virtual geographic spatial object generating system is formed of a 3-hierarchical structure consisting of a client 1 for performing the retrieval and display of a geographic spatial object; an application server 2 for receiving a message from the client 1, generating a virtual geographic spatial object and requesting a retrieval to a data base server; and a data base server 3 for transmitting a geographic spatial object in conformity with the request from the application server 2.

This application server 2 is consisted of process-executing means 4 (Application Service Manager) for performing a log-in request or a log-off request addressed to position informing means (Profiler) 5 in response to a processing request from the client 1, or for performing a virtual geographic spatial object-acquisition request addressed to virtually generating means (Virtual Map Generator) 7; the position informing means 5 for managing, on the basis of individual user unit, a user profile 6 in which a profile ID, script file name and a display attribute file name for meeting a log-in request are stored; a script file 8 storing therein a virtual geographic spatial object generating script (Geographic Script: hereinafter referred to simply as "a script") in which a procedure for fabricating a virtual geographic spatial object is described; the virtually generating means 7 for analyzing the script thereby to develop a virtual geographic spatial object generating operator (Geographic Operation: hereinafter referred to simply as geographic operator); processing means (Virtual Map Operator) 9 for processing the geographic operator through an analysis of the geographic operator; a server access means (Geographic Information System) 10 for enabling a data base server to be accessed through a script in accordance with a retrieval condition that has been input; a data base access processing means 11 for making an access to a geographic data base at the data base server and returning the accessed result thus to the server access means 10; and a display attribute file 12 accumulated therein with display attributes.

Figure 2:
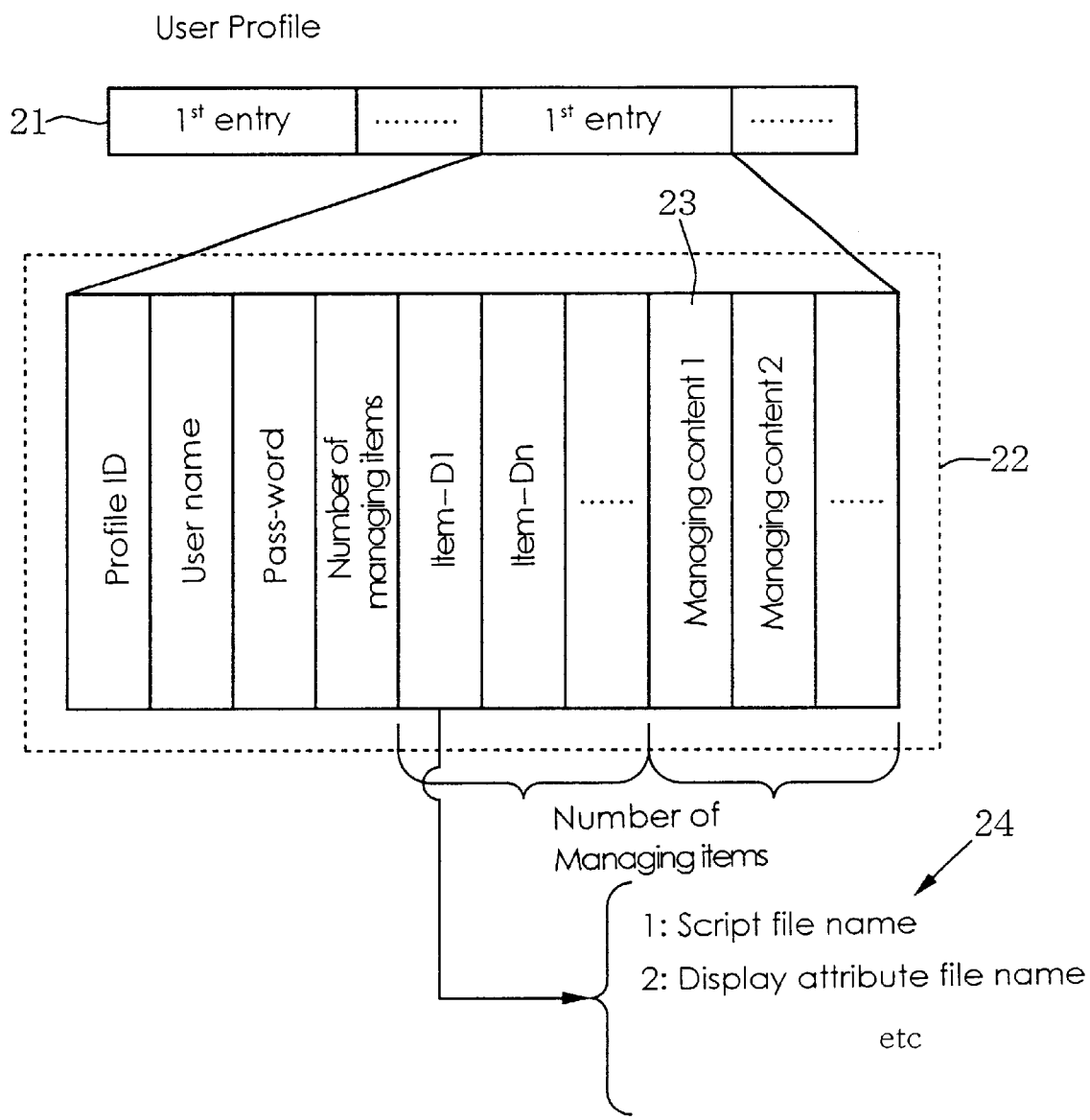
FIG. 2 is a diagram for illustrating the general construction of a user profile.

FIG. 2 shows the construction of the user profile 6. Referring to FIG. 2, the user profile 6 comprises a plurality of entries as indicated by 21. By the way, one entry denotes one user unit, and a profile ID is set therein in accordance with a user name and a pass-word, and hence the virtually generating means 7 and the processing means 9 can be accessed to the user profile 6 through the profile ID.

The entry 22 is constituted by the profile ID, the user name, the pass-word, the number of managing items, an item ID 24 representing the kinds of item being managed, and managing contents 23 representing the contents of items which are actually managed. As specific examples of the item ID, a script file name is set in ID1, and a display attribute file name is set in ID2. Further, an actual file name, etc. corresponding to each item ID 24 is stored in the managing contents 23. Since the entry 22 is provided with a field for the number of managing item and the item ID, even if the managing content is increased or altered in future, the ID of any new additional item can be simply included in the item ID field, thus making it possible to flexibly cope with any addition of managing content in future.

Next, the process of generating a virtual geographic spatial object will be explained.

Figure 3:
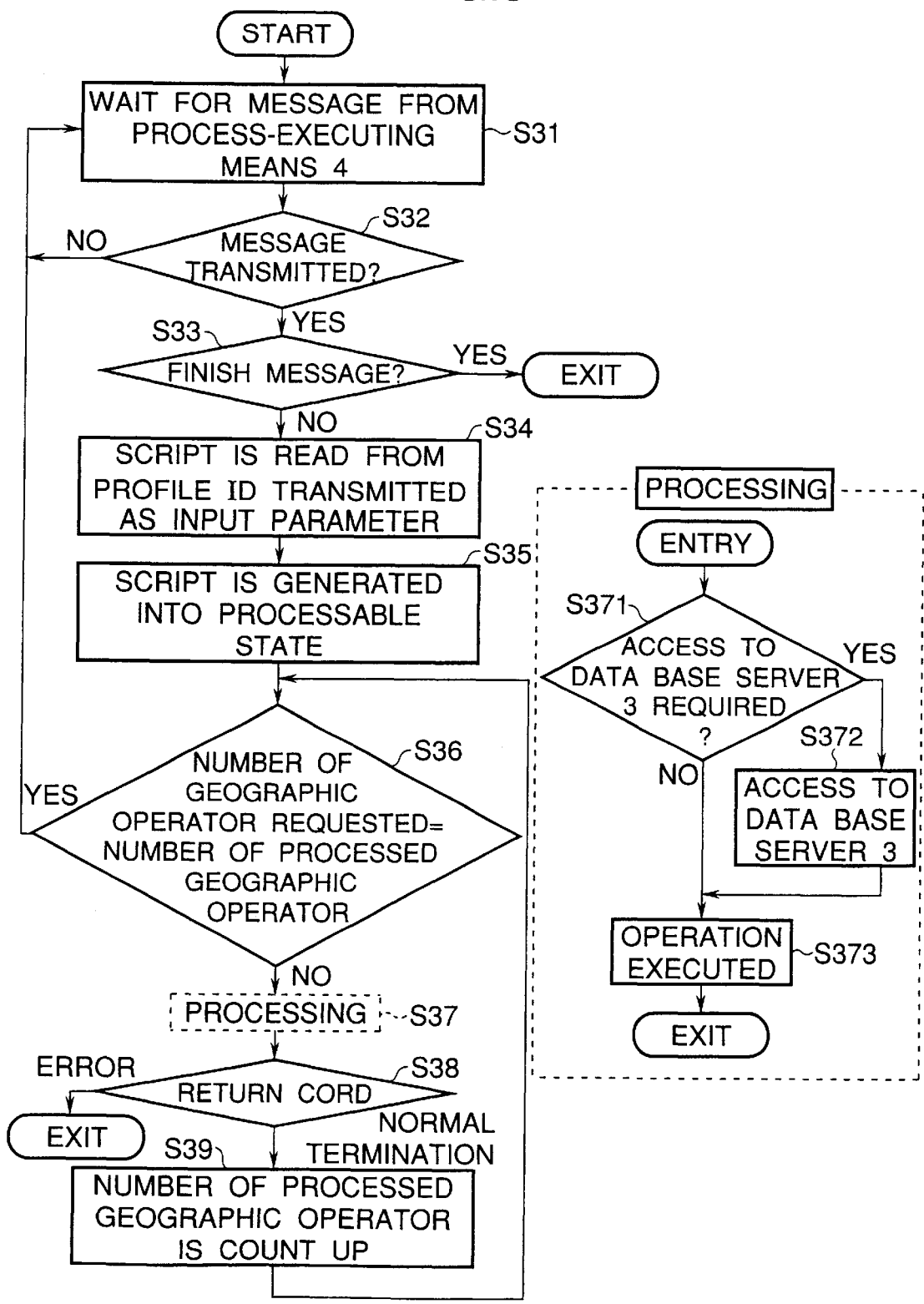
FIG. 3 is a flow chart illustrating a basic flow of generating a virtual geographic spatial object.

FIG. 3 shows a flow chart illustrating a basic flow of generating a virtual geographic spatial object. First of all, the virtually generating means 7 is operated waiting for a message from the process-executing means 4 (steps 31 and 32). When a message is transmitted from the process-executing means 4, the processing is terminated as it is if the content of the message is a termination message (step 33). On the other hand, if the content of the message transmitted is other than the termination message, the script is read out from the profile ID being input (step 34). Then an operable form, i.e. geographic operators are generated from the script data thus read (step 35). Then, in order to carry out a sequence of procedures for operating the geographic operators that have been generated at the step 35, a geographic operand that is an object being requested is determined at first in relative to the geographic operand that has already executed. If these operands are determined as being the same, the procedure is returned to the step 31 so as to wait another message from the process-executing means 4. On the other hand, if there is any script which has not been executed as yet, the processing of the script to be executed is performed (steps 36 and 37). When the sequence of processes are normally finished, the number of executed scripts is counted up (step 39) and then returned to the step 36. On the other hand, if an error is generated, the procedure is terminated (step 38).

Then, the processing (the step 37 in FIG. 3) which is a subroutine will be explained with reference to the flow chart of the processing portion of FIG. 3.

First of all, a determination is performed by the script requested for processing as to whether or not an access to the data server 3 is needed (step 371). When the access is needed, a request is executed to the server access means 10 (step 372) so as to execute the processing by the geographic operator (step 373). If it is determined that the access to the date server 3 is not needed, the processing by the geographic operator is directly performed (step 373).

Then, the general features of the virtual geographic spatial object generating script (script) will be explained with reference to FIGS. 4 and 5.

FIG. 4 is a diagram illustrating descriptive features of the script. First of all, this script can be generally divided into three parts (41), i.e. a map output attribute part for describing a transmitting method for transmitting a virtual geographic spatial object to the client 1; a map operation part for carry out an operation of map; and a connecting end data base server attribute part in which information required for effecting a connection to a data server to be accessed is described. With regard to the identification data of each attribute part, the contents described therein starting from "[MapAttr]" to "[/MapAttr]" are identified as the map output attribute part (42), the contents described therein starting from "[GOperation]" to "[/GOperation]" are identified as the map operation part (43), and the contents described therein starting from "[BindAttr]" to "[/BindAttr]" are identified as the connecting end data base server attribute part (44).

FIG. 5 illustrates a portion of the operation contents of each attribute part in the script. The map output attribute part is provided with various operators such as SpatialRef for designating plane rectangular coordinates or display coordinates representing latitude and longitude; Scale for designating a display scale; Format for designating a data transfer format to the client; DspID for designating a display information; etc. The map processing part can be generally divided according to the items to be processed into a retrieval process, a geometrical process, a coordinate system conversion process, and a data format conversion process. These processes are operated using various operators. Namely, the retrieval process is operated by REF designed to perform a retrieval to the data base server 3. The geometrical process is operated by ADD which is designed to perform a synthesis of virtual geographic spatial object, by LAYER which is designed to perform a selection according to the kind of geographic spatial object, by ROTATION which is designed to perform the rotation of a virtual geographic spatial object, by ZOOMUP which is designed to perform a zoom up of the object, by ZOOMDOWN which is designed to perform a zoom down of the object, and by MOVE which is designed to perform the movement of the object. The coordinate system conversion process is operated by CnvCoordinate which is designed to perform a conversion from plane rectangular coordinates to display coordinates representing latitude and longitude, and by FITTING which is designed to correct an error to be generated at the occasion of the coordinate conversion. The data format conversion process is operated by CnvFormat which is designed to perform a conversion from vector to raster, a conversion from raster to vector, or a conversion from vector to vector (a conversion between different kinds of vector data style). The connecting end data base server attribute part is provided with various operators such as Protocol for setting a protocol such as CORBA or TCP/IP, etc., ServerType for setting the kinds of connecting end data base for setting the kind of data base being connected, HostName and IPAdress which are required at the occasion of TCP/IP protocol, and ObjName which is required for searching an aimed CORBA object at the occasion of CORBA protocol.

Next, the procedures for generating a virtual geographic spatial object will be explained based on the descriptive example of the script.

FIG. 6 shows a specific descriptive example of the script, wherein the descriptive examples 61, 63 and 65 represent the map output attribute part, the map processing part and the connecting end data base server attribute part, respectively. The descriptive examples 62, 64, 66 and 67 represent geographic operators corresponding respectively to each of the aforementioned attribute parts.

Figure 7:
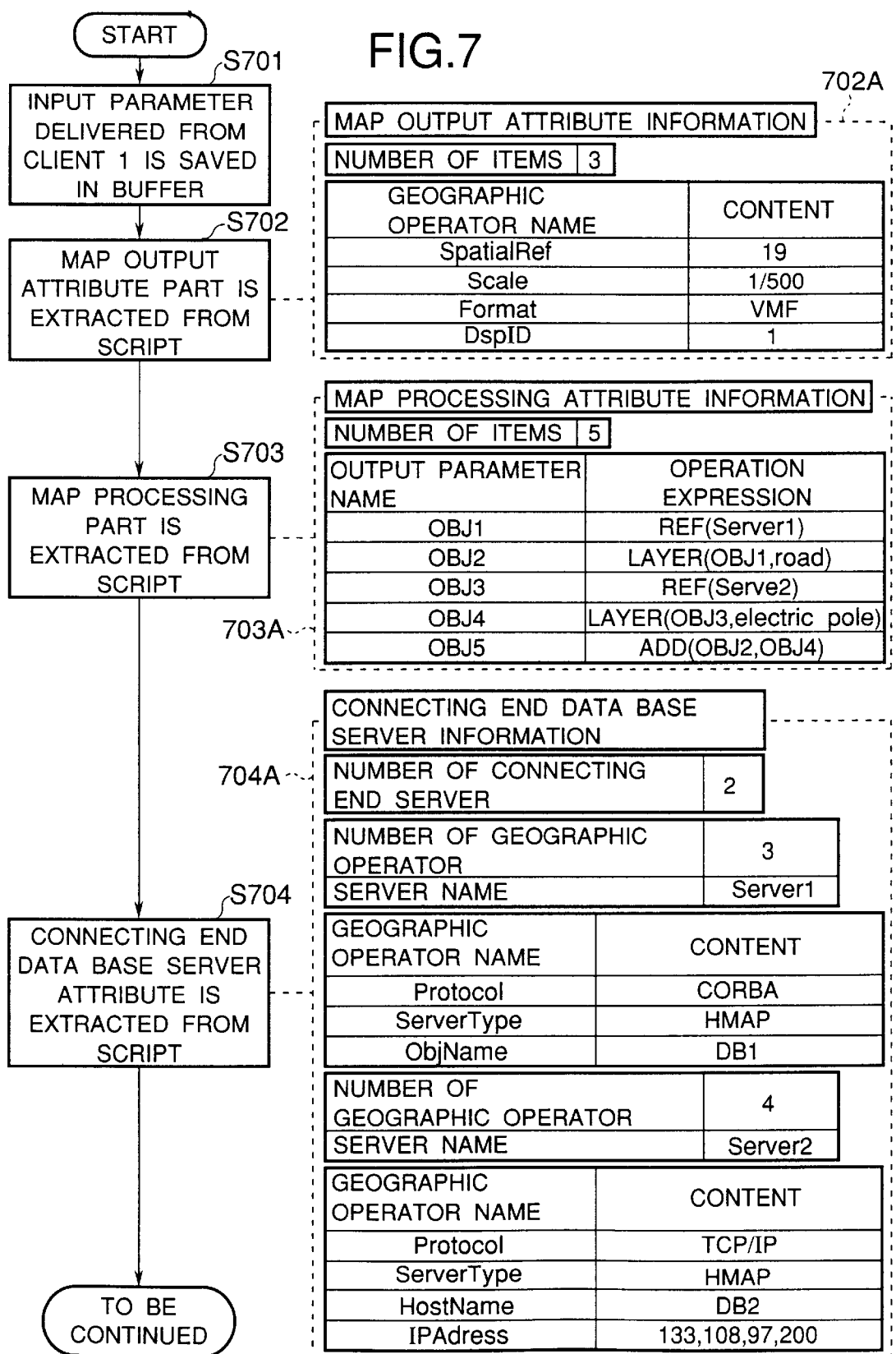
FIG. 7 is a flow chart (No.1) illustrating an analysis procedure of script.
Figure 8:
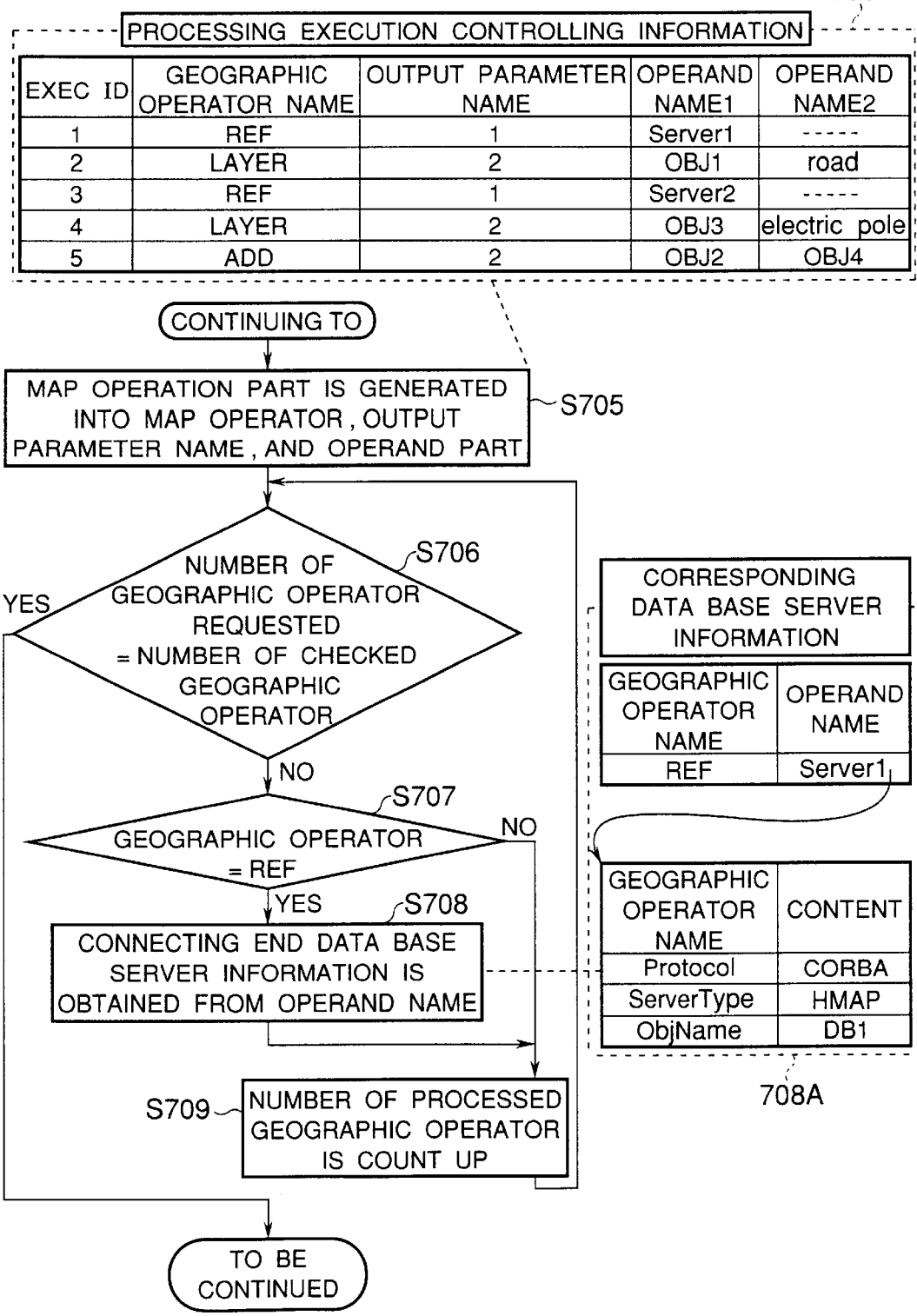
FIG. 8 is a flow chart (No.2) illustrating an analysis procedure of script.
Figure 9:
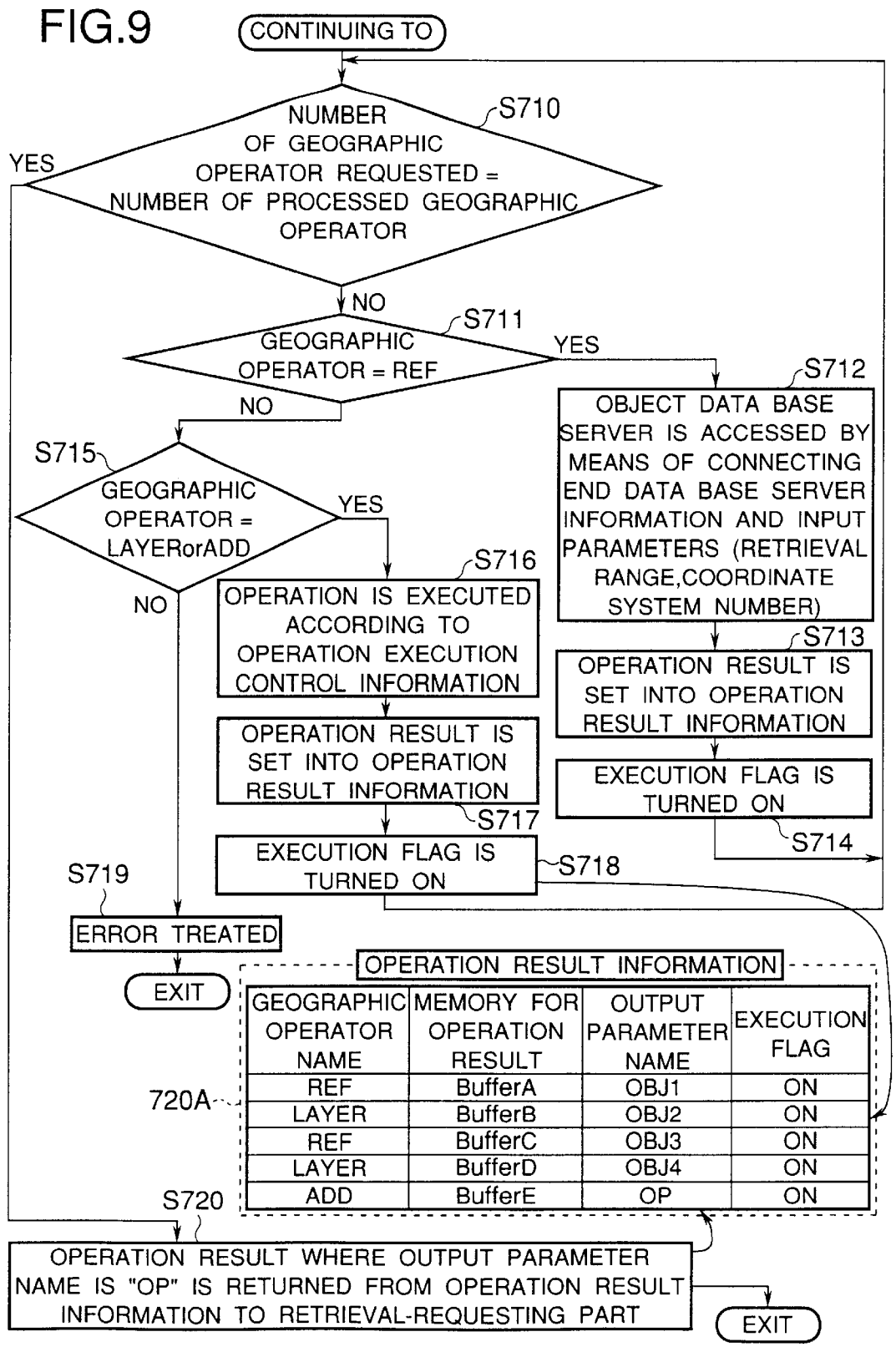
FIG. 9 is a flow chart (No.3) illustrating an analysis procedure of script.

FIGS. 7 to 9 denote the flow charts of analysis procedures of the script and the altered states of data during the analysis. Referring to FIG. 7, first of all, the input parameters (profile ID, attribute range and coordinate system number) that have been delivered from the client 1 are saved in the buffer (step 701). Then, a script is read out from a profile ID to be delivered as an interface, and only the map attribute output portion is extracted from the script thus read out, and the geographic operator name and the content of this map attribute output portion are separately and temporarily saved in the buffer (steps 702, Table 702A). Then, only the map processing portion is extracted from the read script, and the output parameter name and the operation expression are separately and temporarily saved in the buffer (steps 703, Table 703A). Thereafter, only the connecting end data base server attribute part is extracted from the read script, and the geographic operator name and the content of this data base server attribute part are separately and temporarily saved in the buffer (step 704, Table 704A).

Next, referring to FIG. 8, based on the content of buffer at the occasion of processing in the step 703, the map operation part is converted to operation execution controlling information managing an execution order flag, a geographic operator name, an output parameter name, an operand number and an operand name (step 705, Table 705A). Then, in order to obtain information on the connecting end data base server that corresponds to the operand of the operator REF from the operation execution controlling information which has been generated in the step 705, a geographic operand that is an object being requested is determined at first in relative to the geographic operand that has already executed. If these operands are determined as being the same, the procedure is jumped to the step 710 (FIG. 9) (step 706). On the other hand, if there is any script which has not been executed as yet, a judgment is performed as to whether or not the operator is REF (retrieval: FIG. 5). If the operator being checked is determined as being REF, the information on the connecting end data base server is obtained from through the operand name, and the checked operand is counted up (steps 708 and 709, Table 708A). Thereafter, the procedure is returned to step 706. If the operator being checked is determined as being one other than REF, the checked operand is counted up and the procedure is returned to step 706.

Referring to FIG. 9, in order to perform the processing of the geographic operator that has been registered in the operation execution controlling information on the basis of the operation execution controlling information 705A, a geographic operand that is an object being requested is determined at first in relative to the geographic operand that has already executed (step 710). If these operands are determined as being the same as a result, the procedure is jumped to the step 720. If these operands are determined as being not the same, the procedure is proceeded to the next step. Then, a judgment is performed as to whether or not the object geographic operator is REF (step 711). If the operator being checked is determined as being REF, an access to the data base server is performed by making use of the connector end data base server information and the input parameter (retrieval range, coodinate system number) (step 712), and the processed result is set to a processed result information (step 713). Thereafter, an execution flag is set to the processed result information (step 714), and then the procedure is returned to step 710. If the object geographic operator being checked is determined as being one other than REF, the procedure is advanced to step 715. Then, a determination is performed as to if the object geographic operator being checked is LAYER or ADD (step 715). If the object geographic operator is LAYER or ADD, an operation is performed based on the operation execution controlling information (step 716), and the processed result is set to a processed result information (step 717). Thereafter, an execution flag is set to the processed result information (step 718), and then the procedure is returned to step 710. If the object geographic operator being checked is determined as being one other than LAYER and ADD, an error processing is performed (step 719), and then the procedure is terminated. Finally, a key name where an output parameter name denotes "OP" indicating a final processing result is searched from the processed result information, and the result indicating a final result of operation is returned to the retrieval-requesting origin, thus finishing the procedures.

Figure 10:
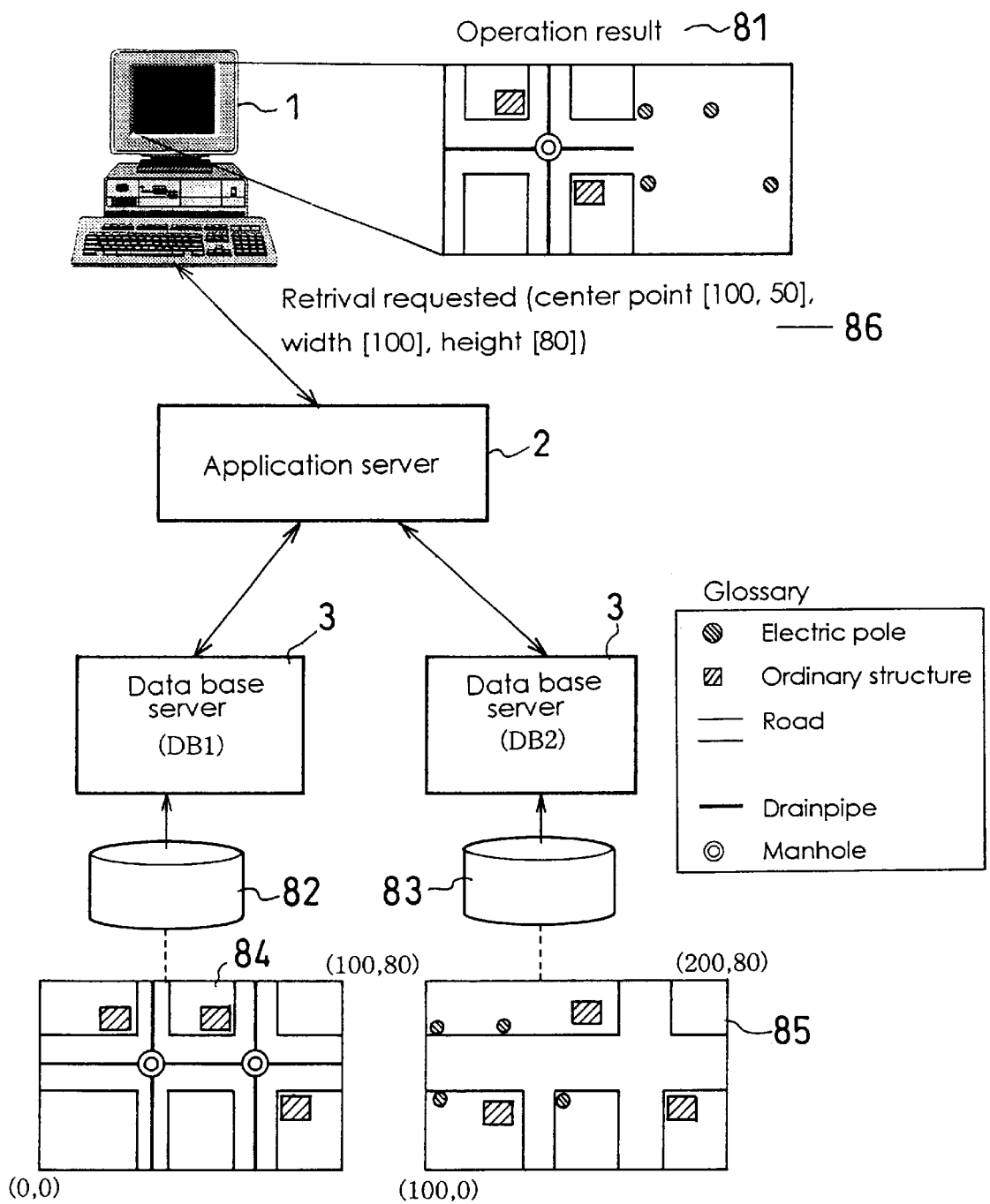
FIG. 10 is a block diagram illustrating one example of display of the client side based on the operation of script.

FIG. 10 shows the example of display on the client end that can be obtained the execution of script as illustrated with reference to FIG. 6.

Referring to FIG. 10, (0, 0) to (100, 80) geographic spatial data screen 84 are stored in the data base server 82, while (100, 0) to (200, 80) geographic spatial data screen 85 are stored in the data base server 83. When the script of the retrieval requesting parameter 86 of (center point (100, 50), width (100), height (80)) is executed, a virtual geographic spatial object of the processed result 81 is generated.

By the way, this invention should not be construed to be limited by the aforementioned embodiments.

For example, the system according to this invention may be a recording medium which is capable of reading a computer and is recorded therein with a program for enabling the computer to be functioned as the aforementioned virtual geographic spatial object generating system.

As explained above, since a script is provided in advance in conformity with the type of work in which the script is to be utilized, it is possible according to this invention to change the utilization form for the work without modifying the application of the client side.

Further, even if any additional retrieval capability is installed at the client side, it can be coped with by simply changing the content of script without correcting the application of the client side, thereby enabling various kinds of geographic information to be served to the client, thus making it possible to very easily meet various requests from the client.

Additionally, since the attributes such as display color can be managed and retrieved by the position informing means in separate to the geographic spatial information, the display attribute is no more required to be added to the geographic spatial information, thereby minimizing the quantity of data to be transmitted and hence shortening the data transferring time.

Since this system is provided with a log-in recognition function which is capable of recognizing the user name and the pass-word, and the display attribute can be altered based on each log-in user unit, the display color can be individually altered based on each log-in user unit even if the same geographic spatial information is being displayed. Therefore, even if the same client application is being utilized by a plurality of departments, it is possible to realize a situation that while a geographic spatial object "A" is being displayed in white at one department, the same geographic spatial object "A" can be displayed in red at another department by simply altering the display attribute in conformity with the log-in.

Furthermore, since not only a transmission system for each data base server is built in the client side, but also the method of connecting the application server with the data base server is effected by making use of the script, the client is only required to simply transmit a message to the application server, so that even if a new data server is to be added to the system, the new data server can be introduced therein without adding any change to the client side.

What is claimed is:

1. A virtual geographic spatial object generating system comprising;
    process-executing means for executing a procedure based on a content of message from a client;
    ID notification means for reading a profile ID corresponding to an individual user in response to a log-in request from the client and notifying the profile ID to said process-executing means; and
    processing means for generating a virtual geographic spatial object by performing a processing based on said profile ID.

2. The virtual geographic spatial object generating system according to claim 1, which further comprises;
    position-informing means for notifying information on a stored position of a virtual geographic spatial object generating script (hereinafter referred to simply as a script) based on the aforementioned profile ID; and
    virtually generating means which reads the script from a script file on a basis of an input retrieval condition and said profile ID and generates geographic operators representing an operation using one or more operands from said script;
    wherein said processing means is designed to request a retrieval to a data base server depending on a kind of said geographic operator thus generated and to perform a processing based on said geographic operator.

3. The virtual geographic spatial object generating system according to claim 2, wherein said position-informing means is designed to notify information on a stored position of attribute information corresponding to said profile ID.

4. The virtual geographic spatial object generating system according to claim 2 or 3, which further comprises server access means for accessing the data base server according to the script and based on the retrieval condition in response to a request from said processing means.

5. A computer-readable recording medium which is recorded with a program for enabling a computer to function as the virtual geographic spatial object generating system as claimed in claim 1.

6. A computer-readable recording medium which is recorded with a program for enabling a computer to function as the virtual geographic spatial object generating system as claimed in claim 2.

7. A computer-readable recording medium which is recorded with a program for enabling a computer to function as the virtual geographic spatial object generating system as claimed in claim 3.

8. A computer-readable recording medium which is recorded with a program for enabling a computer to function as the virtual geographic spatial object generating system as claimed in claim 4.

* * * * *